United States Patent [19]

Kashihara et al.

[11] Patent Number: 4,870,132
[45] Date of Patent: Sep. 26, 1989

[54] POLYMERIZABLE AMPHOINIC RESINS HAVING SILICON-CONTAINING ORGANIC GROUP

[75] Inventors: Akio Kashihara, Hirakata; Tadafumi Miyazono, Takatsuki; Keizou Ishii, Ashiya; Shinichi Ishikura, Tsuzuki, all of Japan

[73] Assignee: Nippon Paint Co., Ltd., Osaka, Japan

[21] Appl. No.: 253,481

[22] Filed: Sep. 20, 1988

Related U.S. Application Data

[63] Continuation-in-part of Ser. No. 55,084, May 28, 1987, abandoned.

[30] Foreign Application Priority Data

May 30, 1986 [JP] Japan ................................ 61-126559

[51] Int. Cl.$^4$ .............................................. C08F 8/00
[52] U.S. Cl. .................................. 525/100; 525/403; 525/446; 525/523
[58] Field of Search ................ 525/446, 403, 523, 100

[56] References Cited

U.S. PATENT DOCUMENTS

| | | | |
|---|---|---|---|
| 4,167,537 | 9/1979 | Taniyama et al. | 525/446 |
| 4,379,872 | 4/1983 | Ishikura et al. | 523/406 |
| 4,468,493 | 8/1984 | Ishikura et al. | 524/513 |
| 4,530,946 | 7/1985 | Kanda et al. | 524/512 |
| 4,657,978 | 4/1987 | Wakabayashi et al. | 525/100 |

*Primary Examiner*—Melvyn I. Marquis
*Attorney, Agent, or Firm*—Millen, White & Zelano

[57] ABSTRACT

A resin composition having (a) amphoionic group of the formula:

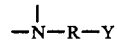

wherein R is optionally substituted $C_1$-$C_6$ alkylene or phenylene and Y is —COOH or —$SO_3H$, (b) an ethylenically unsaturated group, and (c) a silicon-containing organic group. The resin composition is useful as a reactive emulsifier in the emulsion polymerization of ethylenically unsaturated monomers.

12 Claims, No Drawings

POLYMERIZABLE AMPHOINIC RESINS HAVING SILICON-CONTAINING ORGANIC GROUP

BACKGROUND OF THE INVENTION

This application is a continuation-in-part of U.S. Ser. No. 055,084, filed May 28, 1987 now abandoned.

Emulsion polymerization of ethylenically unsaturated monomers requires the use of an emulsifier. Conventional anionic, cationic or nonionic surfactants are water-soluble and therefore, decrease the water-resistance and weatherability of films formed from polymer emulsions containing these surfactants. For this reason, it is desirable to use for such purposes a polymeric emulsifier capable of forming a film, or a compound or resin having an ethylenically unsaturated group capable of copolymerizing with monomers to be polymerized.

Japanese Patent Kokai Nos. 54/92917, 54/92918 and 55/51050, assigned to the assignee of this application disclose compounds having an amphoionic group of the formula:

wherein R is alkylene or phenylene and Y is —COOH or —SO$_3$H, and a radically polymerizable unsaturated group which are useful as a dispersing stabilizer in the emulsion polymerization of monomers.

Japanese Patent Application No. 57/13054 discloses resins having the above amphoionic group and a radically polymerizable unsaturated group which may be used for the same purposes.

The basic concept of these proposals is to prevent bleeding or leaching of emulsifiers from films made of resultant polymer emulsions by introducing a polymerizable function into a water-soluble emulsifier and chemically binding the emulsifier to the resultant emulsion resins. These emulsifiers are, however, still hydrophilic and water-retentive in nature and thus the problem of low water-resistance and weatherability of resultant polymer films remains unsolved by the use of these polymerizable emulsifiers although they are not leachable or bleedable.

SUMMARY OF THE INVENTION

It is, therefore, a main object of this invention to provide a self-polymerizable surface active resin which, when used as a dispersing stabilizer in the emulsion polymerization of ethylenically unsaturated monomers, improves the water-resistance, weatherability and antiblotting property of resulting polymer films.

Other objects and advantages of this invention will become apparent as the description proceeds.

According to this invention, there is provided a resin composition having (a) an amphoionic group of the formula:

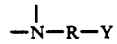

wherein R is optionally substituted C$_1$-C$_6$ alkylene or phenylene and Y is —COOH or —SO$_3$H and a hydroxy group, (b) an ethylenically unsaturated group and (c) a silicon-containing organic group.

The above resin may be used as a dispersing stabilizer or emulsifier in the emulsion polymerization of ethylenically unsaturated monomers, thereby remarkably improving water-resistance and weatherability of resultant polymers. Since this resin has surfactant function imparted by the amphoionic group, it is localized in the vicinity of the interface between water and monomers when monomers are emulsified in the presence of the above resin. As the polymerization proceeds, the resin is firmly secured to the resulting polymer particles by copolymerizing with the monomeric constituents. Since water-repellent and water-resistant silicon-containing groups are also localized on the surface of polymer particles, the water-resistance and weatherability thereof are greatly improved.

The silicon-containing, amphoionic resin of this invention may be synthesized by the following methods depending upon the type of particular base resins.

The first method comprises reacting a base resin having an amphoionic group of the formula:

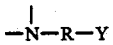

wherein R and Y are as defined, and at least one hydroxyl group with a silane compound of the formula:

wherein A is vinyl or the group

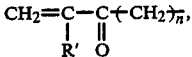

wherein R' is hydrogen or methyl and n is 1–20, X is alkoxy or alkoxyalkoxy, and X' is alkyl, alkoxy or alkoxyalkoxy. This method applies to alkyd, polyester, acrylic and epoxy base resins. The second method comprises reacting said base resin first with 3-aminopropyl-trialkoxysilane or 3-(N-aminoalkyl)-aminopropyl-trialkoxysilane and then with glycidyl (meth)acrylate or isocyanatoethyl (meth)acrylate.

DETAILED DISCUSSION

The group of the formula:

may take an amphoionic form of the formula:

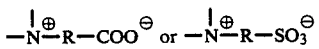

and resins having such amphoionic groups exhibit unique reactivity, surface activity and electrochemical properties.

Alkyd resins and oil-free polyester resins having such amphoionic groups are disclosed in Japanese Patent Kokai Nos. 56/34725 and 56/151727, assigned to the assignee of this application, each of which disclosure is incorporated herein by reference.

Alkyd resin and polyester resin are characterized by forming a series of ester chains using as essential components polycarboxylic acid and polyhydric alcohol. Therefore, when a part of said polyhydric alcohol is replaced by, for example, a compound of the formula:

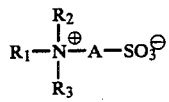 (I)

wherein $R_1$ represents an alkyl having at least one hydroxyl group, $R_2$ and $R_3$ are the same or different, each represents an optionally substituted alkyl group, wherein the substituent may be hydroxy, and A represents optionally substituted alkylene having 1 to 6 carbon atoms or phenylene group, it is possible to obtain an alkyd or polyester resin having the abovesaid amphoionic group in its molecule.

Alkyd or polyester resins having an acid number of 30 to 150, preferably 40 to 150 and a number average molecular weight of 500 to 5000, preferably 700 to 3000 may be used as base resins in the present invention.

Acrylic resins having the group

are disclosed in Japanese Patent Application No. 56/71864 assigned to the assignee of this application, the disclosure of which is incorporated herein by reference.

These acrylic resins may be prepared by copolymerizing a monomer mixture containing an acrylic monomer and a polymerizable amino carboxylic acid or amino sulfonic acid corresponding to the amphoionic group and a hydroxy group-bearing monomer in a solution containing a free radical initiator.

Such polymerizable amino carboxylic acids and amino sulfonic acids are disclosed in Japanese Patent Kokai Nos. 55/51050, 55/53251, 56/145249 and 56/145250, assigned to the assignee of this application, each of which disclosure is incorporated herein by reference. They include compounds having the formulas:

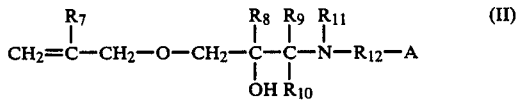 (II)

wherein $R_7$, $R_8$, $R_9$ and $R_{10}$ each represents a member selected from the group consisting of H, $CH_3$ and $C_2H_5$, $R_{11}$ is hydrogen or alkyl having 1 to 20 carbon atoms optionally including in its chain either one of —SO—, —COO— and —O— groups, $R_{12}$ represents an alkylene group having 1 to 21 carbon atoms, optionally substituted with —OH, —SH, —$SR_{13}$ (in which $R_{13}$ is alkyl having 1 to 4 carbon atoms) or one or more of alkyl having 1 to 4 carbon atoms, and A represents a COOH or $SO_3H$ group;

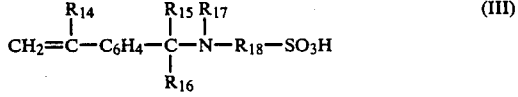 (III)

wherein $R_{14}$, $R_{15}$ and $R_{16}$ each represents H or alkyl having 1 to 6 carbon atoms, $R_{17}$ represents hydrogen or alkyl having 1 to 20 carbon atoms, optionally including in its chain either one of —SO—, —COO— and —O— group, or $R_{17}$ represents a radical of the formula:

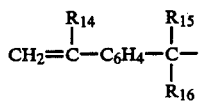

$R_{18}$ represents alkylene having 2 to 12 carbon atoms, optionally substituted with one or more of alkyl groups having 1 to 6 carbon atoms;

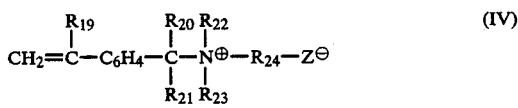 (IV)

wherein $R_{19}$, $R_{20}$ and $R_{21}$ are the same or different and each represents H or $CH_3$, $R_{22}$ represents $C_1$-$C_{20}$ alkyl having at least one hydroxyl group and optionally containing in its alkyl structure a group of —O— or —COO—, $R_{23}$ represents $C_1$-$C_{20}$ alkyl having at least one hydroxyl group and optionally containing in its alkyl structure a group of —O— or —COO—, or H or $C_1$-$C_{20}$ alkyl, $R_{24}$ represents optionally substituted $(CH_2)_n$ (in which n is an integer of from 1 to 6), and Z is COO or $SO_3$; and

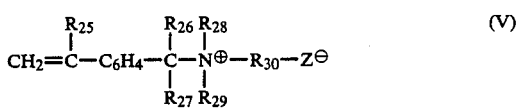 (V)

wherein $R_{25}$, $R_{26}$ and $R_{27}$ are the same or different and each represents H or $CH_3$, $R_{28}$ and $R_{29}$ are the same or different and each represents $C_1$-$C_{20}$ alkyl optionally containing —O— or —COO—, or cycloalkyl group, or $R_{28}$ and $R_{29}$ taken together may form a hetero ring containing nitrogen atom, $R_{30}$ represents optionally substituted $(CH_2)_n$ alkylene in which n is an integer of from 1 to 6, and Z is COO or $SO_3$.

The monomer mixture must contain at least one hydroxy bearing monomer. Other comonomers such as carboxyl bearing monomers, glycidyl bearing monomers, alkyl acrylates or methacrylates, N-containing alkyl acrylates or methacrylates, polymerizable amides, polymerizable nitriles, polymerizable aromatic compounds, α-olefins, vinyl compounds and diene compounds may be incorporated into the monomer mixture.

Preferably, these acrylic resins should have an acid number of 30 to 180, most preferably 40 to 160, and a number average molecular weight of 500 to 10,000 and most preferably 700 to 6000. Modified epoxy resins are prepared by reacting an epoxy resin with an amino sulfonic acid corresponding to the above-mentioned amphoionic group to convert at least a portion of the epoxide groups into the amphoionic group.

Modified epoxy resins having the group

are disclosed in Japanese Patent Kokai No. 57/40522 corresponding to U.S. Pat. No. 4,379,872, assigned to the assignee of this application, each of which disclosure is incorporated herein by reference. In general, epoxy resin is characterized by having at the end of the polymer chain a group of the formula:

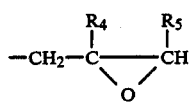 (VI)

wherein $R_4$ and $R_5$ each represents hydrogen or methyl group. Therefore, it is possible to obtain a modified epoxy resin having at the end of polymer chain a quantity of such radical as

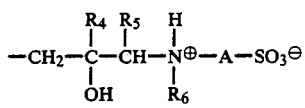 (VII)

by the reaction of said epoxy resin with a compound of the formula:

$$R_6-NH-A-SO_3M \quad (VIII)$$

wherein $R_6$ is an alkyl group optionally substituted with a radical incapable of reacting with epoxy group, M stands for alkali metal or ammonium, and A has the same meaning as defined above. In proportion to the quantity of said amphoionic groups, the hydrophilic property of the modified epoxy resin will increase.

Polyether type epoxy resins having the group

are disclosed in Japanese Patent Kokai No. 57/40522, assigned to the assignee of this application, whose disclosure is incorporated herein by reference.

These resins may be synthesized by reacting a compound of the formula:

$$R_{33}-NH-A-SO_3M \quad (IX)$$

wherein $R_{33}$ is a substituent incapable of reacting with an epoxy group, A represents an alkylene or phenylene, and M stands for alkali metal or ammonium group, to a polyether type epoxy resin having at the end of the polymeric chain a group of the formula:

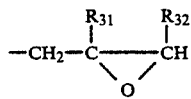 (X)

wherein $R_{31}$ and $R_{32}$ each represents hydrogen or a methyl group, thereby obtaining a modified polyether type epoxy resin having at the end of polymeric chain a group of the formula:

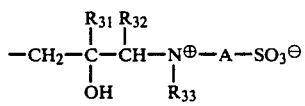 (XI)

Various polyether type epoxy resins are commercially available and prepared by reacting various polyphenols other than bisphenol A or polyhydric alcohols with an epihalohydrin.

The foregoing alkyd, polyester, acrylic and epoxy base resins all have the amphoionic group

and hydroxy groups in the molecule. Accordingly, when a silane compound of the formula:

wherein all symbols are as defined, is reacted with these resins, a polymerizable unsaturated function is introduced into the resins simultaneously with the introduction of silicon-containing organic groups.

Examples of silane compounds of the above formula include vinyl-triethoxysilane, vinyl-tris(2-methoxyethoxy)silane and 3-methacryloylpropyl-trimethoxysilane. Usually 1 to 3 moles of the silane compound are used per mole of the base resin.

In the second method, the above-mentioned base resins are reacted first with 3-aminopropyl-trialkoxysilane such as 3-aminopropyl-trimethoxysilane, or 3-(N-aminoalkyl)aminopropyl-trialkoxysilane such as 3-(N-2-aminoethyl)aminopropyltrimethoxysilane, and then with glycidyl (meth)acrylate or isocyanatoethyl (meth)acrylate. Usually 1 to 3 moles of the aminosilane compound are reacted per mole of the base resin. Glycidyl (meth)acrylate or isocyanatoethyl (meth)acrylate is preferably used in moles equal to those of aminosilane.

All of the abovementioned resins do possess in their molecule a characteristic amphoionic group of

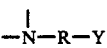

and may be prepared either as water soluble type or as an organic solvent soluble type. When selecting a water soluble type resin, this is quite useful as emulsifiers and dispersing agent in the emulsion polymerization of ethylenically unsaturated monomers in an aqueous medium and therefore, without using any additional emulsifier, it is possible to prepare a stable emulsion or dispersion of polymer particles. When a monomer mixture consisting totally or partly of polyfunctional monomers, internally crosslinked polymer microparticles may be prepared.

The polymerization may preferably and advantageously be carried out by adding a mixture of defined amounts of each monomer to an aqueous medium containing the above-said amphoionic type resin, in the presence of a polymerization initiator. The amount of said amphoionic type resin may vary within a wide range, and, in general, it is in the order of 0.3 to 30%, and preferably 0.5 to 20%, by weight of the monomer mixture.

The reaction medium, i.e. water, may be used in an amount so as to give a resinous emulsion of 2 to 65%, preferably 20 to 60%, non-volatile solid content. In order to assist the solubilization of said amphoionic resin, a quantity of basic material equivalent to the acid number may present in the reaction medium. As the basic materials, use can be made of alkali metal hydroxides, ammonia and organic amines, but for reason of volatile property and giving no residual inorganic ions in the formed coating, preference is given to ammonia or organic amine. The aqueous medium may also contain a water miscible organic solvent, if required.

As the polymerization initiator, any conventional initiator may satisfactorily be used including organic peroxides as benzoyl peroxide, t-butyl peroxide and cumene hydroperoxide, organic azo-compounds as azobiscyanovaleric acid, azobisisobutyronitrile, azobis-(2,4-dimethyl)-valeronitril, and azobis-(2-amidinopropane)-hydrochloride, inorganic water soluble radical initiators as potassium persulfate, ammonium persulfate, sodium persulfate and hydrogen peroxide, and redox type initiators comprising the combination of said inorganic water soluble radical initiator and sodium pyrosulfite, sodium hydrogen sulfite or bivalent Fe ion. They may be used each alone or in combination. Such initiator may be previously contained in the reaction medium or may be added to the reaction system simultaneously with the addition of constituent monomers. The amount of initiator is usually in a range of from 0.05 to 5%, preferably 0.1 to 3%, by weight of the total monomers to be copolymerized. If desired, a conventional chain transfer agent as lauryl mercaptan, hexyl mercaptan and the like may be present in an appropriate amount.

The resulting polymers mainly consist of polymers of monofunctional monomers as disclosed in Japanese Patent Kokai No. 57/187302 or internally crosslinked polymer microparticles as disclosed in Japanese Patent Kokai No. 58/129066, both assigned to the assignee of this application. The disclosure of each of said patent documents is incorporated herein by reference.

The silicon-containing amphoionic resin of this invention is particularly useful, as discussed hereinbefore, as a dispersing stabilizer in the synthesis of said polymers using the emulsion polymerization technique in order to impart water-resistance and weatherability to the polymers.

The following examples will further illustrate the present invention. All parts and percentages therein are by weight unless otherwise specified.

EXAMPLE 1

Into a 2 liters flask fitted with stirrer, nitrogen inlet pipe, thermoregulator, condenser and decanter, were placed 134 parts of bishydroxyethyl taurine, 65 parts of neopentylglycol, 84 parts of trimethylolpropane, 236 parts of azelaic acid, 186 parts of phthalic anhydride and 27 parts of xylene, and the mixture was heated, while removing the formed water azeotropically with xylene. The temperature was raised to 190° C. in about 2 hours from the commencement of reflux and stirring and dehydration were continued until the acid number reached 145. Then the reaction mixture was allowed to cool to 140° C. and while maintaining the same temperature, 314 parts of Cardura E-10 (glycidyl versatate, manufactured by Shell Chem. Co.) were added dropewisely in 30 minutes. After continuing stirring for 2 hours, the reaction was completed. The thus obtained polyester resin had an acid number of 55, hydroxyl number of 120 and a number-average molecular weight of 1100.

After the above base resin was cooled to 100° C. while stirring, 141 parts of 3-methacryloyloxypropyl-trimethoxysilane and 0.3 parts of hydroquinone monomethyl ether were added dropwise over 30 minutes. Thereafter the mixture was kept at the same temperature for 30 minutes to complete the reaction.

The contents of elementary sulfur and silicon measured by X-ray fluorometry were 2.4% and 2.1%, respectively. The content of carbon-to-carbon double bond was $7.2 \times 10^{-4}$ eq./g.

EXAMPLE 2

A similar flask as used in Example 1 was charged with 100 parts of ethylene glycol monomethyl ether and the content was heated to 100° C. Two drip funnels were fitted to the flask. One drip funnel was charged with 75 parts of N-methyl-N-vinylbenzyltaurine dissolved in 100 parts of ethylene glycol monomethyl ether containing a small amount of dimethylethanolamine. The other drip funnel was charged with a mixture consisting of 50 parts of 2-hydroxyethyl acrylate, 10 parts of acrylic acid, 110 parts of methyl methacrylate, 110 parts of styrene, 145 parts of n-butyl acrylate and 10 parts of laurylmercaptan. 10 parts of azobisisobutyronitrile were dissolved in this mixture.

The content of each drip funnel was dripped concurrently over 120 minutes and the mixture stirred for 60 minutes while maintaining the temperature at 100° C. Then the solvent was replaced by ethylene glycol monomethyl ether acetate while evaporating the reaction mixture in a rotary evaporator.

The resulting resin solution was transferred to the same apparatus as used in Example 1 and kept at 100° C. with stirring. To this were added 64 parts of 3-methacryloyloxy-propyl-trimethoxysilane and 0.1 parts of hydroquinone monomethyl ether dropwise over 30 minutes. The reaction was continued for additional 30 minutes at the same temperature to bring completion. The resulting resin solution was evaporated in a rotary evaporator to a solid content of 95% to give an acrylic resin having an average molecular weight of 4600.

The contents of elementary sulfur and silicon measured by X-ray fluorometry were 5.1% and 4.4%, respectively. The carbon-to-carbon double bond content was $1.5 \times 10^{-3}$ eq./g.

EXAMPLE 3

A flask used in Example 1 was charged with 73.5 of sodium taurinate, 100 parts of ethylene glycol, and 200 parts of ethylene glycol monomethyl ether. The temperature was raised to 120° C. with stirring to give a uniform solution. To the solution was added with stirring a solution of 470 parts of EPIKOTE 1001 (Shell Chemical Company, bisphenol A diglycidyl ether epoxy resin having an epoxy equivalent of 470) in 400 parts of ethylene glycol monomethyl ether over 2 hours. The mixture was stirred at the same temperature for additional 20 hours to complete the reaction.

After the reaction, the mixture was acidified with hydrochloric acid. The resultant precipitate was recovered, purified by re-precipitating with ethylene glycol monoethyl ether, and then dried in vacuo to give 518 parts of a modified epoxy resin.

The above resin was redissolved in ethylene glycol monomethyl ether acetate to a nonvolatile content of 60%. To the solution were added 190 parts of vinyl-trimethoxysilane and 0.4 parts of hydroquinone monomethyl ether dropwise over 30 minutes while stirring at 100° C. The reaction was continued for additional 30 minutes at the same temperature to bring completion. Thereafter the mixture was evaporated in a rotary evaporator to remove the solvent. A resinous product having a nonvolatile content of 93% was obtained.

The contents of elementary sulfur and silicon measured by X-ray fluorometry were 8.8% and 3.7%, respectively. The carbon-to-carbon double bond content was $1.4 \times 10^{-3}$ eq./g.

EXAMPLE 4

Into a 2 liters flask fitted with stirrer, nitrogen inlet pipe, thermoregulator, condenser and decanter, were placed 134 parts of bishydroxyethyl taurine, 65 parts of neopentylglycol, 84 parts of trimethylolpropane, 236 parts of azelaic acid, 186 parts of phthalic anhydride and 27 parts of xylene, and the mixture was heated, while removing the formed water azeotropically with xylene. The temperature was raised to 190° C. in about 2 hours from the commencement of reflux and stirring and dehydration were continued until the acid number reached 145. Then the reaction mixture was allowed to cool to 140° C. and while maintaining the same temperature, 314 parts of Cardura E-10 (glycidyl versatate, manufactured by Shell Chem. Co.) were added dropwise in 30 minutes. After continuing stirring for 2 hours, the reaction was completed. The thus obtained polyester resin had an acid number of 55, hydroxyl number of 120 and a number-average molecular weight of 1100.

After the above base resin was cooled to 100° C. with stirring, 138 parts of 3-aminopropyl-trimethoxysilane were added dropwise over 30 minutes. Thereafter the mixture was kept at the same temperature for 30 minutes. After 0.3 parts of hydroquinone monomethyl ether dissolved in 5 parts of ethylene glycol monobutyl ether were added, 85 parts of glycidyl methacrylate were added dropwise over 30 minutes. Thereafter the temperature was raised to 120° C. and maintained this temperature for additional 30 minutes to complete the reaction.

The contents of elementary sulfur and silicon measured by X-ray fluorometry were 2.2% and 1.9%, respectively. The carbon-to-carbon content was $7.0 \times 10^{-4}$ eq./g.

EXAMPLE 5

A 1 liter flask having stirring means and temperature-control means was charged with 230 parts of deionized water and heated to 80° C.

A pre-emulsion was prepared by adding a monomer mixture consisting of 50 parts of methyl methacrylate, 50 parts of styrene, 73 parts of n-butyl acrylate and 7 parts of 2-hydroxyethyl methacrylate to a solution of 20 parts of the resin prepared in Example 1 and 3 parts of dimethylethanolamine in 170 parts of water with stirring.

A polymerization initiator solution was prepared by dissolving 2 parts of azobiscyanovaleric acid and 1.3 parts of dimethylethanolamine in 50 parts of deionized water.

After confirming the temperature of water in the flask to be 80° C., the pre-emulsion and initiator solution separately prepared as above were concurrently added to the flask over 60 minutes and 70 minutes, respectively. The reaction was continued for additional 60 minutes at the same temperature to bring completion. A polymer emulsion having a nonvolatile content of 30.2% was obtained. The average size of dispersed polymer particles was 130 nm.

This emulsion was applied on a glass plate to a dry film thickness of 40 micron by means of a doctor blade. After one day, the film was soaked in hot water at 40° C. for 24 hours. No change was observed in the film.

EXAMPLES 6–8

Analogously to Example 5, polymer emulsions were prepared using resinous emulsifiers and monomer mixtures shown in the following table. Properties of the resulting emulsions and water-resistance of films are also shown in the table.

|  | Example 6 | Example 7 | Example 8 |
|---|---|---|---|
| Resin of Example 2 | 21 | — | — |
| Resin of Example 3 | — | 21.5 | — |
| Resin of Example 4 | — | — | 20 |
| Methyl methacrylate | 57 | 45 | 50 |
| Styrene | 56 | 45 | 50 |
| n-Butyl acrylate | — | 73 | — |
| 2-Ethylhexyl acrylate | 60 | — | 67 |
| 2-Hydroxyethyl methacrylate | 7 | 7 | 7 |
| Ethylene glycol dimethacrylate | — | 10 | 6 |
| Properties of emulsion |  |  |  |
| Nonvolatile content (%) | 30.1 | 29.9 | 30.3 |
| Particle size (nm) | 200 | 80 | 140 |
| Appearance of film after soaking in water at 40° C. for 24 hrs. | No change | No change | No change |

We claim:

1. A polymerizable amphoionic resin composition consisting essentially of the reaction product of a resin having an amphoionic group of the formula:

wherein R is $C_1$–$C_6$ alkylene or phenylene and Y is —COOH or —SO$_3$H, and a hydroxy group with (I) silane compound of the formula:

wherein A is vinyl or the group

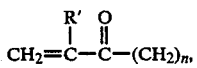

wherein R' is hydrogen or methyl and n is 1–20, X is alkoxy or alkoxyalkoxy, and X' is alkyl, alkoxy or alkoxyalkoxy; or with (II) 3-aminopropyl-trialkoxysilane or 3-(N-aminoalkyl)-aminopropyltrialkoxysilane followed by reaction with glycidyl(meth)acrylate or isocyanatoethyl(meth)acrylate; said resin having the amphoionic group and hydroxy group being selected from the group consisting of:

(a) a polyester resin prepared by reacting a polycarboxylic acid component and a polyhydric alcohol component with a part of the polyhydric alcohol component being replaced by a compound of the formula:

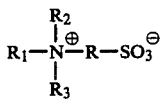

wherein R is as defined, $R_1$ is alkyl having at least one hydroxy group, $R_2$ and $R_3$ each represents H or is the same as $R_1$;

(b) an acrylic resin prepared by copolymerizing a monomer mixture containing a polymerizable amino carboxylic acid or aminosulfonic acid corresponding to said amphoionic group and a hydroxy group-bearing monomer, and (c) a modified epoxy resin prepared by reacting an epoxy resin with an amino sulfonic acid corresponding to said amphoionic group to convert at least a portion of its epoxide groups into said amphoionic group.

2. The resin composition according to claim 1, wherein the reaction product is the product of the reaction of the amphoionic group-bearing resin with a silane compound of the formula:

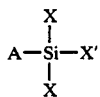

wherein A is vinyl or the group

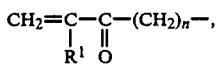

wherein R' is hydrogen or methyl and n is 1-20, X is alkoxy or alkoxy-alkoxy, and X' is alkyl, alkoxy or alkoxyalkoxy.

3. The resin composition according to claim 2, wherein said silane compound is vinyl-triethoxysilane, vinyl-tris(2-methoxyethoxy)silane or 3-methacrylpropyltrimethoxysilane.

4. The resin composition according to claim 1, wherein the reaction product is a product of the reaction of the amphoionic group-bearing resin with 3-(N-aminopropyl-trialkoxysilane or 3-(N-aminoalkyl)aminopropyl-trialkoxysilane and then with glycidyl (meth)acrylate or isocyanatoethyl (meth)acrylate.

5. The resin composition according to claim 4, wherein said 3-aminopropyl-trialkoxysilane is 3-aminopropyltrimethoxysilane, and said 3-(N-aminoalkyl)aminopropyltrialkoxysilane is 3-(N-2-aminoethyl)-aminopropyl-trimethoxysilane.

6. The resin composition according to claim 1, wherein the resin is a modified epoxy resin as defined therein.

7. The resin composition according to claim 1, wherein the resin is an acrylic resin as defined therein.

8. The resin composition according to claim 1, wherein said resin is a polyester resin as defined therein having an acid number of 30 to 150 and a number average molecular weight of 500 to 5000.

9. The resin composition according to claim 1, wherein said resin is an acrylic resin as defined therein having an acid number of 30 to 180 and a number average molecular weight of 500 to 10,000.

10. The resin composition of claim 8, wherein a part of the polyhydric alcohol component is replaced by bis(hydroxyethyl)taurine.

11. The resin composition of claim 9, wherein said monomer mixture contains N-methyl-N-vinyl benzyl-taurine.

12. The resin composition of claim 6, wherein the modified epoxy resin is produced by reacting epoxy resin with sodium taurinate.

* * * * *

UNITED STATES PATENT AND TRADEMARK OFFICE
CERTIFICATE OF CORRECTION

PATENT NO. : 4,870,132

DATED : September 26, 1989

INVENTOR(S) : AKIO KASHIHARA ET AL

It is certified that error appears in the above-identified patent and that said Letters Patent is hereby corrected as shown below:

Column 12, claim 4, line 10:

reads "tion of the amphoionic group-bearing resin with 3-(N- should read -- tion of the amphoionic group-bearing resin with 3- --

Signed and Sealed this

Fourth Day of September, 1990

*Attest:*

HARRY F. MANBECK, JR.

*Attesting Officer*     *Commissioner of Patents and Trademarks*